United States Patent
Zhang et al.

(10) Patent No.: US 11,242,607 B2
(45) Date of Patent: Feb. 8, 2022

(54) METAL MATERIAL WITH THERMODYNAMIC ANISOTROPY AND A METHOD OF PREPARING THE SAME

(71) Applicant: Suzhou Shinhao Materials LLC, Suzhou (CN)

(72) Inventors: Yun Zhang, Suzhou (CN); Jing Wang, Suzhou (CN); Peipei Dong, Wujiang (CN); Xingxing Zhang, Suzhou (CN)

(73) Assignee: SUZHOU SHINHAO MATERIALS LLC, Wujiang (CN)

(*) Notice: Subject to any disclaimer, the term of this patent is extended or adjusted under 35 U.S.C. 154(b) by 0 days.

(21) Appl. No.: 16/982,262

(22) PCT Filed: Mar. 1, 2019

(86) PCT No.: PCT/CN2019/076687
§ 371 (c)(1),
(2) Date: Sep. 18, 2020

(87) PCT Pub. No.: WO2020/057060
PCT Pub. Date: Mar. 26, 2020

(65) Prior Publication Data
US 2021/0017660 A1    Jan. 21, 2021

(30) Foreign Application Priority Data
Sep. 18, 2018 (CN) .......................... 201811090322.4

(51) Int. Cl.
*B32B 15/00* (2006.01)
*C25D 3/38* (2006.01)

(52) U.S. Cl.
CPC .......... *C25D 3/38* (2013.01); *B32B 2307/536* (2013.01); *B32B 2307/706* (2013.01); *Y10T 428/12431* (2015.01)

(58) Field of Classification Search
None
See application file for complete search history.

(56) References Cited

U.S. PATENT DOCUMENTS

| | | | |
|---|---|---|---|
| 7,989,057 B2* | 8/2011 | Alderson | C08J 5/04 428/292.1 |
| 2004/0164462 A1* | 8/2004 | Wada | B29C 70/62 264/429 |
| 2017/0029400 A1* | 2/2017 | Zhang | C07D 311/84 |

FOREIGN PATENT DOCUMENTS

| CN | 103924268 A | 7/2014 |
|---|---|---|
| CN | 103924269 A | 7/2014 |

(Continued)

OTHER PUBLICATIONS

Xian et al., "Anisotropic thermal expansion of Ni3Sn4, Ag3Sn, Cu3Sn, Cu6Sn5, and beta-Sn", Aug. 2017, Intermetallics, vol. 91, pp. 50-64 (Year: 2017).*

*Primary Examiner* — Seth Dumbris
(74) *Attorney, Agent, or Firm* — SZDC Law P.C.

(57) ABSTRACT

A metal material having thermodynamic anisotropy has an X-axis hardness of 160-180 HV, an X-axis hardness thermal expansion coefficient of $5 \times 10\text{-}6\text{-}100 \times 10\text{-}6$ $K^{-1}$; a Y-axis hardness of 160-180 HV, a Y-axis hardness thermal expansion coefficient of $5 \times 10\text{-}6\text{-}100 \times 10\text{-}6$ $K^{-1}$; and a Z-axis hardness of 180-250 HV, a Z-axis hardness thermal expansion coefficient of $50 \times 10\text{-}6\text{-}1000 \times 10\text{-}6$ $K^{-1}$. A method for preparing a metal material having thermodynamic anisotropy is also disclosed.

4 Claims, 1 Drawing Sheet

(56) References Cited

FOREIGN PATENT DOCUMENTS

| | | |
|---|---|---|
| CN | 106170484 A | 11/2016 |
| CN | 106757191 A | 5/2017 |
| CN | 108396344 A | 8/2018 |
| CN | 109112580 A1 | 1/2019 |
| WO | 2018095133 A1 | 5/2018 |

* cited by examiner $$\alpha_x = \frac{1}{\Delta T}\frac{x2-x1}{x1} \qquad \alpha_y = \frac{1}{\Delta T}\frac{y2-y1}{y1} \qquad \alpha_x = \frac{1}{\Delta T}\frac{z2-z1}{z1}$$

METAL MATERIAL WITH THERMODYNAMIC ANISOTROPY AND A METHOD OF PREPARING THE SAME

The present invention is the National Stage Application of PCT/CN2019/076687, filed on Mar. 1, 2019, which claims priority to Chinese Patent Application No.: 201811090322.4, filed on Sep. 18, 2018, which is incorporated by reference for all purposes as if fully set forth herein.

FIELD OF THE INVENTION

The present invention relates to the field of metal materials, and in particular, a metal material having thermodynamic anisotropy and a method for preparing the same.

BACKGROUND OF THE INVENTION

Single crystals have physical properties when measured in different directions, i.e., anisotropy, while metallic materials generally do not exhibit anisotropy. Metal materials are often polycrystalline, with different crystal orientations and overall isotropic (pseudo-isotropic). The crystal orientation of the processed metal tends to be uniform, exhibiting anisotropy. For example, rolling (especially hot-rolled) steel sheets tend to exhibit anisotropy in the rolling direction and the vertical rolling direction due to the crystal fibers extending along the rolling direction. Therefore, the mechanical properties of the steel sheet vary greatly in the rolling direction and the direction perpendicular to the rolling direction.

Most metals are polycrystalline, so they usually do not have anisotropy. They may have a certain anisotropy after machining, but it is difficult to make fine metal materials with anisotropy that are suitable for micro motors and micro sensors. Micro-Electro-Mechanical Systems, Internet of Things, Smart Devices all use micro motors and micro sensors. New anisotropic metal materials are urgently needed for making micro motors and micro sensors to meet the increasing demand.

SUMMARY OF THE INVENTION

In one embodiment, the present invention provides a metal material having thermodynamic anisotropy. The metal material has an X-axis hardness of 160-180 HV, an X-axis hardness thermal expansion coefficient of $5\times10^{-6}$-$100\times10^{-6}$ $K^{-1}$; a Y-axis hardness of 160-180 HV, a Y-axis hardness thermal expansion coefficient of $5\times10^{-6}$-$100\times10^{-6}$ $K^{-1}$; and a Z-axis hardness of 180-250 HV, a Z-axis hardness thermal expansion coefficient of $50\times10^{-6}$-$1000\times10^{-6}$ $K^{-1}$.

In another embodiment, the metal material is selected from the group consisting of copper, tin, silver, nickel, chromium, cobalt, and an alloy thereof.

In another embodiment, the X-axis hardness is 140-150 HV, the Y-axis hardness is 140-150 HV, and the Z-axis hardness is 190-220 HV.

In another embodiment, the X-axis hardness thermal expansion coefficient is $5\times10^{-6}$-$10\times10^{-6}$ $K^{-1}$, the Y-axis hardness thermal expansion coefficient is $5\times10^{-6}$-$10\times10^{-6}$ $K^{-1}$, and the Z-axis hardness thermal expansion coefficient is $80\times10^{-6}$-$120\times10^{-6}$ $K^{-1}$.

In one embodiment, the present invention provides a method for preparing a metal material having thermodynamic anisotropy. The method includes (1) providing an electroplating base solution that includes a salt of the metal material, an acid; (2) providing additives to the electroplating base solution, the additive including a brightener, a carrier, a leveling agent, a surfactant, and an antioxidant; (3) mixing the additives with the electroplating base solution to form an electroplating solution; and (4) conducting a direct current plating process to form the metal material.

In another embodiment, the metal salt is copper sulfate, either containing tin ions, silver ions, nickel ions or cobalt ions, and in the electroplating base solution, the metal salt has a concentration of 10 to 100 g/L; the acid is sulfuric acid, or other corresponding acids, and in the electroplating base solution, the acid has a concentration of 10-100 g/L.

In another embodiment, the brightener is an organosulfate having formula (I):

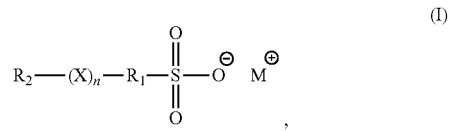

(I)

in formula (I), X is O or S; n is 1 to 6; M is hydrogen, alkali metal, or ammonium; $R_1$ is an alkylene, cyclic alkylene group of 1 to 8 carbon atoms, or an aromatic hydrocarbon of 6 to 12 carbon atoms; and $R_2$ is $MO_3SR_1$, and in the electroplating solution, the brightener has a concentration of 1-10 mL/L.

In another embodiment, the organosulfate is sodium lauryl sulfate, disodium 3,3-dithiobispropane-sulphonate, or 3,3'-dithiobispropanesulfonic acid.

In another embodiment, the carrier is a copolymer of ethylene oxide and propylene oxide, and in the electroplating solution, the carrier has a concentration of 10-20 mL/L.

In another embodiment, the leveler is

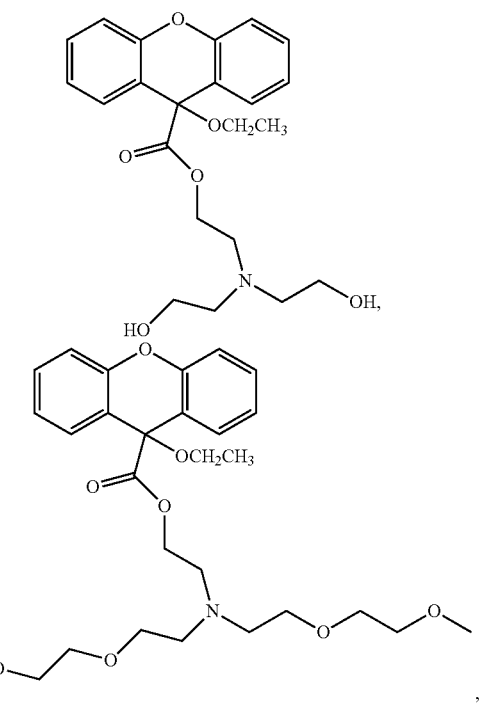

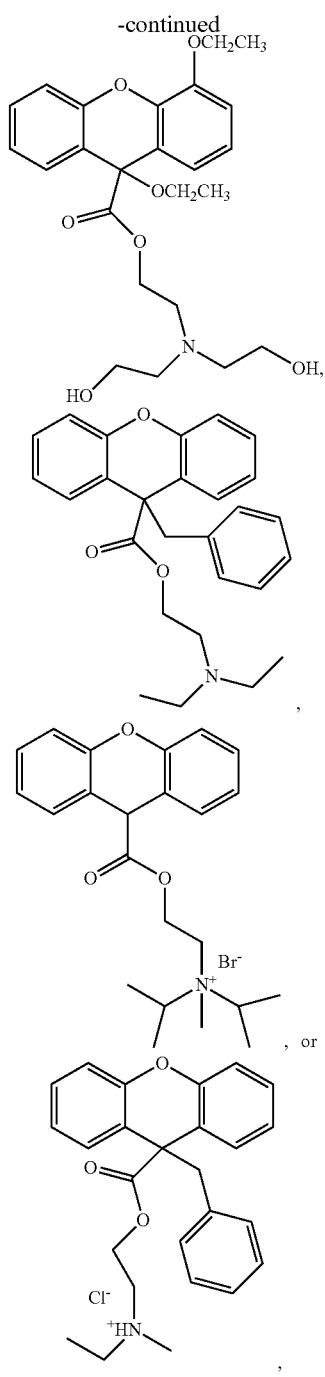

and in the electroplating solution, the leveler has a concentration of 30-70 mL/L.

In another embodiment, the surfactant is polyethylene glycol, and in the electroplating solution, the surfactant has a concentration of 20-120 mL/L.

In another embodiment, the antioxidant is sorbic acid or citric acid, and in the electroplating solution, the antioxidant has a concentration of 10 g/L.

In another embodiment, the direct current plating process is conducted at a current density of 2-30 A/dm².

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
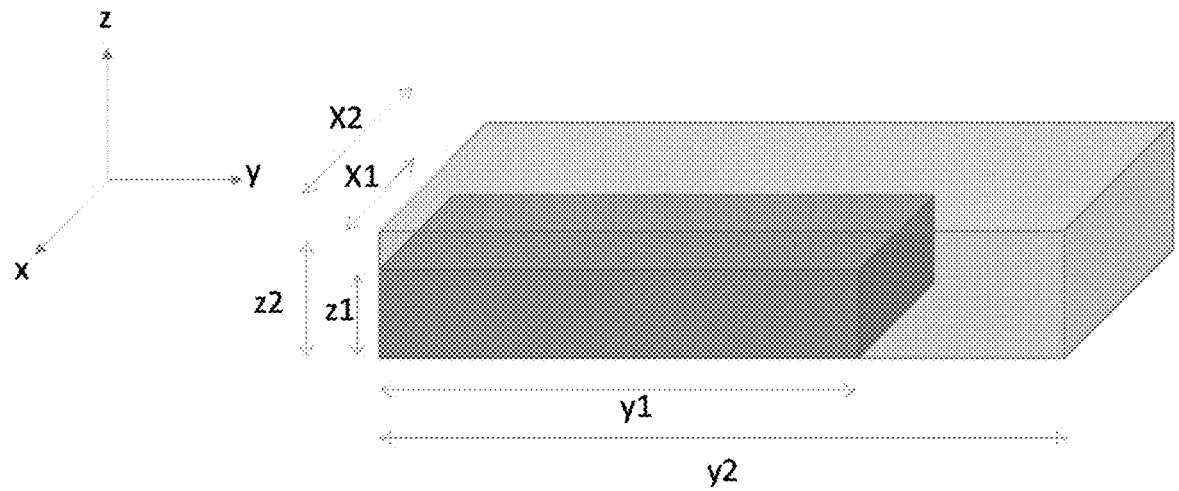
FIG. 1 shows the measurement and calculation of thermal expansion coefficients in the X-axis, Y-axis and the Z-axis directions.

Reference will now be made in detail to embodiments of the present invention, example of which is illustrated in the accompanying drawings.

For convenience of description, the examples all use an anisotropic copper material as an example. The present invention is not limited to copper. Metal materials containing tin, silver, nickel, chromium, cobalt, or an alloy thereof can also be prepared by the same method as the copper material.

Example 1

Preparation of a metal material with thermodynamic anisotropy (hardness in the X-axis, Y-axis, and Z-axis directions).

A copper sulfate solution having a divalent copper ion concentration of 40 g/L, a sulfuric acid solution having a sulfuric acid concentration of 120 g/L, and a hydrochloric acid having a chloride ion concentration of 50 ppm were mixed and stirred for two hours to form an electroplating base solution. Electroplating additives, a brightener (accelerator), the main component being an organosulfate having formula (I); a carrier, the main component being polyethylene glycol; and a leveler, the main component being a quaternary ammonium salt having formula (II), were added to the electroplating base solution form an electroplating solution. The concentration of the brightener in the electroplating solution was 4 mL/L; the concentration of the carrier in the electroplating solution was 15 mL/L; and the concentration of the leveler in the electroplating solution was 35 mL/L.

A substrate was plated in the electroplating solution for 40 minutes at a current density of 5 A/dm².

After electroplating, the copper film was gently peeled off from the substrate. The hardness values of the copper film in the X-axis, Y-axis, and the Z-axis directions were measured in a microhardness test.

The test results were as follows: X-axis microhardness: 143.28 HV; Y-axis hardness: 145.44 HV, and the Z-axis microhardness: 201.47 HV. The copper film had significant hardness anisotropy.

Example 2

Preparation of a metal material with thermodynamic anisotropy (thermal expansion coefficient in the X-axis, Y-axis, and Z-axis directions).

A copper sulfate solution having a divalent copper ion concentration of 50 g/L, a sulfuric acid solution having a sulfuric acid concentration of 100 g/L, and a hydrochloric acid having a chloride ion concentration of 50 ppm were mixed and stirred for three hours to form an electroplating base solution. Electroplating additives, a brightener (accelerator), the main component being an organosulfate having formula (I); a carrier, the main component being polyethylene glycol; and a leveler, the main component being a quaternary ammonium salt having formula (II), were added to the electroplating base solution form an electroplating solution. The concentration of the brightener in the electroplating solution was 4 mL/L; the concentration of the carrier in the electroplating solution was 10 mL/L; and the concentration of the leveler in the electroplating solution was 70 mL/L.

A substrate was plated in the electroplating solution for 20 minutes at a current density of 10 A/dm$^2$.

FIG. 1 shows the measurement and calculation of thermal expansion coefficients in the X-axis, Y-axis and the Z-axis directions.

After electroplating, the copper film was peeled off from the substrate. The thermal expansion coefficients of the copper film in the X-axis, Y-axis and the Z-axis directions were measured by a mechanical thermal expansion analyzer (Nexus, Germany), temperature rising range: 20-400° C.

The test results were as follows: at 20-400° C., thermal expansion coefficient in the X-axis direction: $6.8\times10^{-6}$/K; thermal expansion coefficient in the Y-axis direction $6.9\times10^{-6}$/K; and thermal expansion coefficient in the Z-axis direction $91.7\times10^{-6}$/K.

Thermal expansion coefficient in the Z-axis direction is more than 10 times higher than those in the X-axis and Y-axis directions.

Example 3

Preparation of a metal material with thermodynamic anisotropy (thermal expansion coefficient and etching resistance in the X-axis, Y-axis, and Z-axis directions).

A copper sulfate solution having a divalent copper ion concentration of 60 g/L, a sulfuric acid solution having a sulfuric acid concentration of 80 g/L, and a hydrochloric acid having a chloride ion concentration of 60 ppm were mixed and stirred for three hours to form an electroplating base solution. Electroplating additives, a brightener (accelerator), the main component being an organosulfate having formula (I); a carrier, the main component being polyethylene glycol (a mixture of polyethylene glycol with molecular weight of 4000 and polyethylene glycol with molecular weight of 800); and a leveler, the main component being a quaternary ammonium salt having formula (II), were added to the electroplating base solution form an electroplating solution. The concentration of the brightener in the electroplating solution was 6 mL/L; the concentration of the carrier in the electroplating solution was 10 mL/L; and the concentration of the leveler in the electroplating solution was 30 mL/L.

A substrate was plated in the electroplating solution for 20 minutes at a current density of 15 A/dm$^2$.

After electroplating, the copper film was peeled off from the substrate. The thermal expansion coefficients of the copper film in the X-axis, Y-axis and the Z-axis directions were measured by a mechanical thermal expansion analyzer (Nexus, Germany), temperature rising range: 20-400° C.

Figure 2:
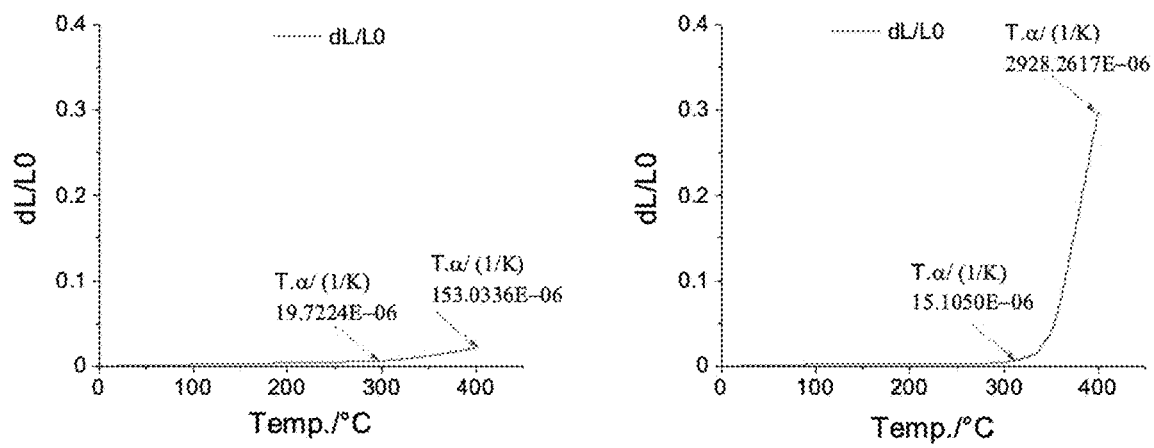
FIG. 2 shows the thermal expansion coefficients of the metal material of Example 3 in the X-axis, Y-axis and the Z-axis directions.

The test results were as follows: at 20-400° C., thermal expansion coefficient in the X-axis direction: $153\times10^{-6}$/K; thermal expansion coefficient in the Y-axis direction $160\times10^{-6}$/K; and thermal expansion coefficient in the Z-axis direction $2928\times10^{-6}$/K. FIG. 2 shows the thermal expansion coefficients in the X-axis direction or Y-axis direction and the thermal expansion coefficients in the Z-axis direction.

Thermal expansion coefficient in the Z-axis direction is more than 20 times higher than those in the X-axis and Y-axis directions.

The etching rate determination includes the following steps: wafer cutting (3 cm*4 cm), wafer plating (10 ASD*12 min), cleaning (DI water), drying (90° C.*1 hour), weighing G1, soft etching 2 minutes, cleaning (DI water), drying (90° C.*1 hour), weighing G2, morphology (OM). The plating area was 3 cm*3 cm, and etching solution was $H_2SO_4/H_2O_2$/additive FE830. The etching rates are calculated by weighing method. The results are shown in the table below.

|  | X-axis | Y-axis | Z-axis |
| --- | --- | --- | --- |
| Example 3 | 0.06 μm/min | 0.06 μm/min | 0.18 μm/min |
| Comparative Example (Market Leader) | 0.14 μm/min | 0.14 μm/min |  |

The etching rates were measured under the same condition, and comparative example was prepared using current market leader electroplating solution and method.

These materials of the present inventions can be used as a component of the temperature-controlled micromotor. Because the Z-axis direction has a large thermal expansion coefficient and hardness, the temperature-controlled micromotor prepared by the material will have large torque, and thus is stable and safe.

The methods described use an electroplating base solution of a metal salt and an acid, electroplating additives and a DC electroplating process, and have the following advantages:

First, a regular electroplating process is used and reduces the complexity of the mechanical processing scheme; precision can be reached micron level; and no specialized equipment is required. Second, the electroplated metal or alloy material has thermodynamic anisotropy, especially the thermal expansion coefficient and etching resistance. Third, the additives can carry a high current density, thereby achieving high-speed plating, so the production efficiency is improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A metal material having thermodynamic anisotropy comprising:
   an X-axis hardness of 160-180 HV, an X-axis thermal expansion coefficient of $5\times10^{-6}$-$100\times10^{-6}$ K$^{-1}$;
   a Y-axis hardness of 160-180 HV, a Y-axis thermal expansion coefficient of $5\times10^{-6}$-$100\times10^{-6}$ K$^{-1}$; and
   a Z-axis hardness of 180-250 HV, a Z-axis thermal expansion coefficient of $50\times10^{-6}$-$1000\times10^{-6}$ K$^{-1}$,
   wherein the metal material is prepared by a process that includes the following steps:
   preparing an electroplating base solution that includes a copper sulfate solution having a divalent copper ion concentration of 40 g/L, a sulfuric acid solution having a sulfuric acid concentration of 120 g/L, and a hydrochloric acid having a chloride ion concentration of 50 ppm;

adding an organosulfate having a concentration of 4 mL/L, polyethylene glycol having a concentration of 15 ml/L, and a quaternary ammonium salt having a concentration of 35 mL/L to the electroplating base solution; and conducting electroplating at a current density of 5 A/dm² for 40 minutes to obtain the metal material, wherein the organosulfate is sodium lauryl sulfate, disodium 3,3-dithiobispropane-sulphonate, or 3, 3'-dithiobispropanesulfonic acid and the quaternary ammonium salt is

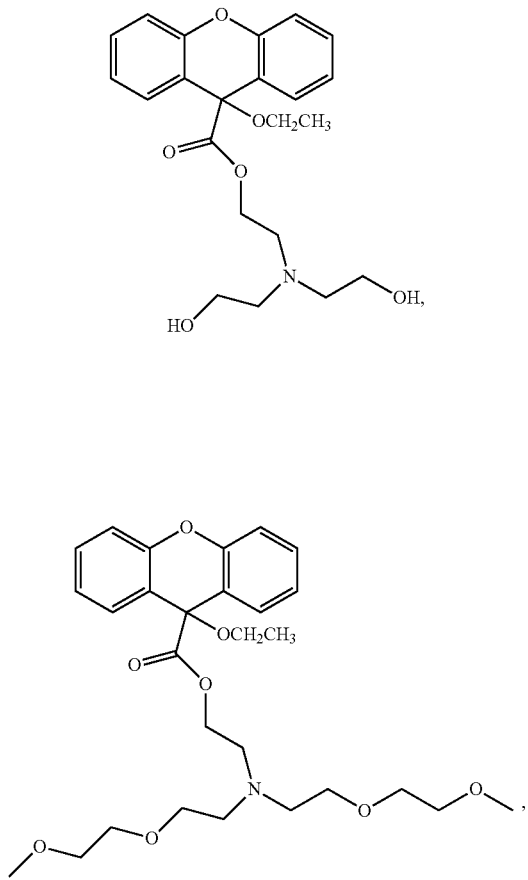

-continued

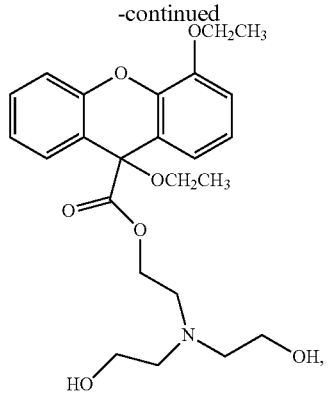

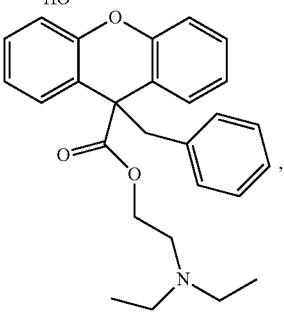

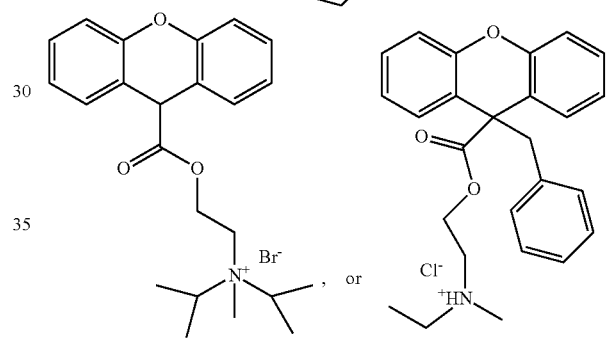

2. The metal material of claim 1, wherein the metal material is selected from the group consisting of copper, tin, silver, nickel, chromium, cobalt, and an alloy thereof.

3. The metal material of claim 1, wherein the X-axis hardness is 140-150 HV, the Y-axis hardness is 140-150 HV, and the Z-axis hardness is 190-220 HV.

4. The metal material of claim 1, wherein the X-axis thermal expansion coefficient is $5\times10^{-6}$-$10\times10^{-6}$ $K^{-1}$, the Y-axis thermal expansion coefficient is $5\times10^{-6}$-$10\times10^{-6}$ $K^{-1}$, and the Z-axis thermal expansion coefficient is $80\times10^{-6}$-$120\times10^{-6}$ $K^{-1}$.

* * * * *